Jan. 28, 1958 W. J. IRVINE 2,821,248
WINDSHIELD COVER
Filed Jan. 17, 1955
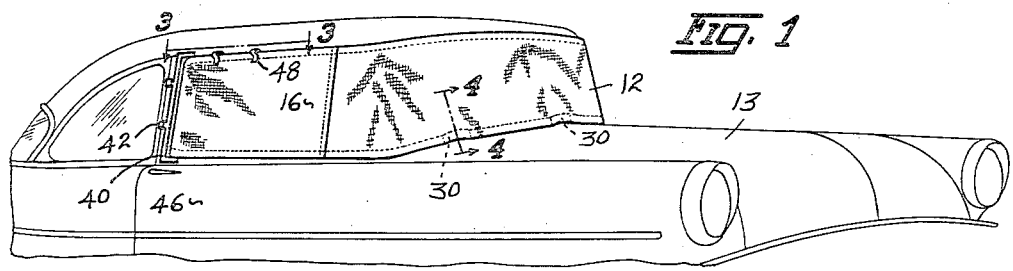
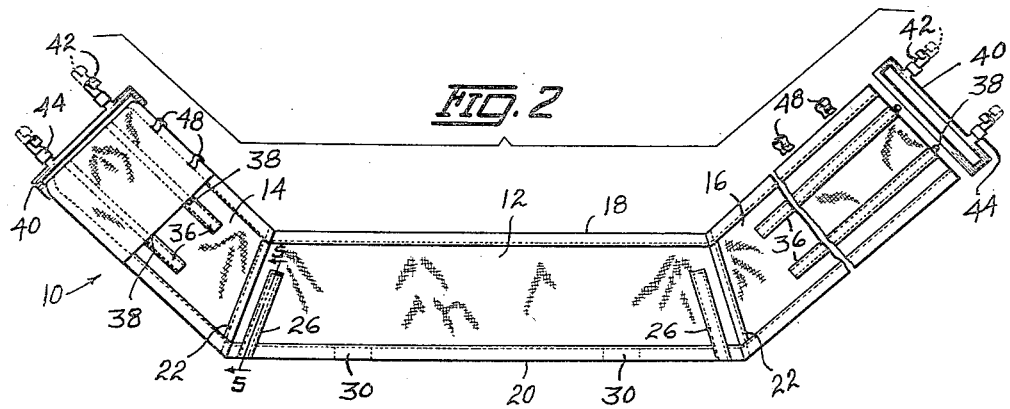
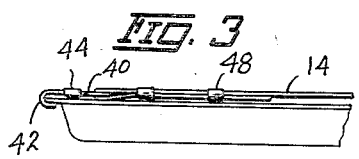
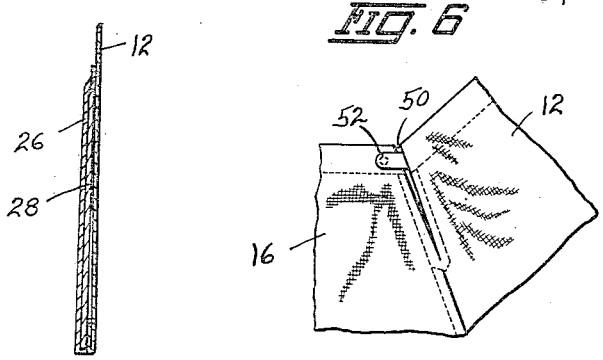
INVENTOR.
WILLIAM J. IRVINE
BY Talbert Dick & Adler
ATTORNEYS.

United States Patent Office 2,821,248
Patented Jan. 28, 1958

2,821,248

WINDSHIELD COVER

William J. Irvine, Boone, Iowa

Application January 17, 1955, Serial No. 482,139

5 Claims. (Cl. 160—368)

My invention relates to a novel cover for the windshield and front door windows of an automobile, truck or the like.

The accumulation of snow, ice and sleet on the windows of vehicles when they are parked is a serious matter in climates where winter conditions are prevalent. Such conditions are a hazard to driving since many drivers do not take the time to adequately clean the windshield and side windows for proper visibility but are content to scraping off only enough for a peephole, so to speak, which materially limits the capacity of the driver to see.

With these observations in mind it is the general aim of my invention to provide a cover means for the windshield and adjacent windows of a vehicle that can be quickly and easily mounted or removed.

A further object of this invention is to provide a cover of the above class that can be adjusted to fit vehicles of different sizes and models and which adequately protects the entire area of the window covered from sleet, snow or ice.

Other objects of this invention are to provide a cover as above described that is light and easy to handle, economical to manufacture and very durable.

These and other objects will be apparent to those skilled in the art.

My invention consists in the construction, arrangements and combination, of the various parts of the device, whereby the objects contemplated are attained as hereinafter more fully set forth, specifically pointed out in my claims, and illustrated in the accompanying drawings, in which:

Fig. 1 is a perspective view of a preferred embodiment of my new cover applied to the windshield and adjacent window on an automobile, Fig. 2 is an elevational view of the inner side of my invention, Fig. 3 is a top view of one of the end sections of my cover taken from the line 3—3 of Fig. 1, Fig. 4 is a cross sectional view of this cover taken on the line 4—4 of Fig. 1, Fig. 5 is a cross sectional view of this cover taken on the line 5—5 of Fig. 2, and Fig. 6 is a fragmentary perspective view showing a modified structure between the center section and one end portion of this cover for use on vehicles that have externally mounted sun visors.

Referring to the drawings and particularly to Fig. 2, my cover indicated generally by the numeral 10 is formed into three sections, namely, a center section 12 to cover the windshield of a vehicle 13 and two respective like end or side sections 14 and 16 respectively for covering the respective windows adjacent the windshield or, in other words, those on the doors to the driver's compartment. Preferably cover 10 is made from a flexible material such as canvas, duck, denim or the like but may, of course, be made from any other suitable material. The center section 12 is cut on the bias at its ends so that the top edge 18 is shorter than the bottom edge 20 and the respective ends 14 and 16 are likewise cut on the bias at their forward ends which are joined as by stitching 22 to the respective ends of section 12 whereby it can be flat against the respective glass areas as shown in Fig. 1. All top and bottom edges are preferably turned under and stitched as at 24 in Fig. 4 for obvious reasons. Near the respective ends of center section 12, I have provided the elongated stitched pockets 26 which are open at the bottom to receive a stiffener or stay 28 (Fig. 5) which aids in holding section 12 down in the event of any wind. Also on section 12 at the bottom I provide a pocket 30 on the inner side in the seam opposite each point 32 where the windshield wiper 34 is mounted and this pocket is designed to engage or catch on point 32 which further secures it against flapping or creeping up the windshield in any wind. The pockets 30 are formed by merely placing two parallel spaced apart wall sections within the seam on bottom edge 20 as partially shown in Figures 2 and 4.

On the inner side of each side section 14 and 16 I have sewed strips of material 36 and preferably use two strips to the side in parallel spaced relationship to each other and to the top and bottom edges of the respective section. Small hooks 38 are fastened to the outer edge of each section 14 and 16 and are designed to engage the respective strips 36 as will be later described. These hooks are of any common variety which are capable of being selectively secured to any fabric and which become more secure in their grasp as tension is brought upon them from a lateral direction. A rigid loop or frame-like member 40 made from plastic or the like has a pair of hooks 42 projecting from one side which are mounted to a rubber collar or the like 44 to provide some slight resiliency.

In adjusting cover 10 to a particular vehicle, the center section is fitted to the windshield with pockets 30 engaging points 32 as described and the outer ends of the sections 14 and 16 are threaded through the loops in frames 40 and then laid back upon themselves where hooks 38 can be engaged with strips 36 to hold them in place. Hooks 42 are engaged with the rearward edge of the vehicle door 46 and the sections 14 and 16 can be adjusted as needed, sufficiently to provide a slight tension on collars 44. When this adjustment has been completed, a pair of friction clamps 48 are provided to hold the folded back portion of the sections 14 and 16 to their main body. It is these clamps 48 which actually hold the adjustment of the sides 14 and 16 in place and hooks 38 merely keep them from flapping. Once this cover has been adjusted as described for a particular vehicle, no other adjustments are necessary and the entire cover can be applied or removed in a matter of seconds. Should the material in the cover become stretched a little, all slack can be taken out simply by the same method with which it was originally adjusted.

Thus arranged, it will be appreciated that the windshield and adjacent windows of the vehicle can be effectively protected from snow and ice so that when the cover is removed, the driver immediately has adequate visibility. Today when the number of vehicles both private and commercial that are not housed in garages is increasing daily, this cover provides a means that will materially add to the safety in driving and will eliminate the use of newspapers, cardboards, and the like presently used at times to accomplish the purpose of this cover. It will also eliminate the need for scraping the glass areas, which is generally never done adequately because of the inconvenience involved, and, of course, will avoid scratches to the glass which sometimes occur.

In Fig. 6, I have shown a slight modification between the center section and side section of cover 10 in that the adjoining edges are not stitched all the way but only at the bottom portion. This allows the upper portion to be opened as at 50 for placement around a brace (not shown)

which is used with external sun visors. The snap flaps 52 are sufficient for this obvious purpose and in all other respects the cover is made and used as above described.

It is submitted that the invention shown and described is aptly suited to achieve the purposes intended and is characterized by a combination of highly useful and mutually cooperating elements that combine their respective and proportionate functions in accomplishing the objects sought to be obtained.

Some changes may be made in the construction and arrangement of my windshield cover without departing from the real spirit and purpose of my invention, and it is my intention to cover by my claims, any modified forms of structure or use of mechanical equivalents which may be reasonably included within their scope.

I claim:

1. A cover for the windshield of a vehicle and for the windows in the respective doors that afford access to the driver's compartment of said vehicle, said windshield of a type having a wiper member with a wiper arm pivotally mounted relative to the lower edge of the windshield said cover comprising, a length of flexible material having a center section for covering the windshield and two respective end sections for covering the respective windows on the doors, means for securing each respective end section to the edges of a respective door, and a pocket formed in the lower edge of said center section for embracing the bottom of said wiper arm to hold said center section against flapping in a wind.

2. A cover for the windshield of a vehicle and the door windows adjacent thereto, comprising, a length of flexible material having a center section for covering the windshield, and two respective end sections for covering the windows on the doors to the driver's compartment, means for securing each respective end section to the edge of one of said doors, means for selectively adjusting the length of each end section, the juncture of each end of said center section and a respective end section provided with a slit in the upper portion thereof, and means for securing the open end portion of each respective slit.

3. A cover designed to extend from the rearmost edge of one door of the driver's compartment of a vehicle across the window in said door, thence across the windshield of the vehicle, and then across the window on the other door of the driver's compartment and to the rearmost edge of said last mentioned door, said cover comprising, a length of flexible material having a center section and two respective like end sections, said cover having a top and bottom edge, a pocket formed in the lower edge of said center section, a stiffener member in said center section, a rigid loop member for the outer end of each end section, hook means on each loop member, each end section threadable through one of said loop members and foldable back upon itself, and fastening means for securing the outer end of each end section to its main portion.

4. A cover designed to extend from the rearmost edge of one door of the driver's compartment of a vehicle across the window in said door, thence across the windshield of the vehicle, and then across the window on the other door of the driver's compartment and to the rearmost edge of said last mentioned door, said cover comprising, a length of flexible material having a center section and two respective like end sections, said cover having a top and bottom edge, a pocket formed in the lower edge of said center section, a stiffener member in said center section, a rigid loop member for the outer end of each end section, hook means yieldingly arranged on each loop member, each end section threadable through one of said loop members and foldable back upon itself, and fastening means for securing the outer end of each end section to its main portion.

5. A cover for the windshield of a vehicle and for the windows in the respective doors that afford access to the driver's compartment of said vehicle, said windshield of a type having a wiper member with a wiper arm pivotally mounted relative to the lower edge of the windshield, said cover comprising, a length of flexible material having a center section for covering the windshield and two respective end sections for covering the respective windows on the doors, means for securing each respective end section to the edges of a respective door, means for selectively adjusting the length of each end section, and a pocket formed in the lower edge of said center section for embracing the bottom of said wiper arm to hold said center section against flapping in a wind.

References Cited in the file of this patent

UNITED STATES PATENTS

| | | |
|---|---|---|
| 153,955 | Herrmann | Aug. 11, 1874 |
| 2,238,795 | Katzner | Apr. 15, 1941 |
| 2,283,828 | Strombach | May 19, 1942 |
| 2,437,845 | Wyeth | Mar. 16, 1948 |
| 2,586,153 | Eisman | Feb. 19, 1952 |
| 2,614,630 | Moszelt | Oct. 21, 1952 |
| 2,624,406 | Szychowski et al. | Jan. 6, 1953 |